(12) United States Patent
Goebel et al.

(10) Patent No.: US 6,838,669 B1
(45) Date of Patent: Jan. 4, 2005

(54) WIDE OPERATIONAL RANGE THERMAL SENSOR

(75) Inventors: John H. Goebel, Foster City, CA (US); Robert E. McMurray, Jr., Alameda, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 82 days.

(21) Appl. No.: 10/135,014

(22) Filed: Apr. 25, 2002

(51) Int. Cl.⁷ ............................. G01J 5/20; G01J 5/24
(52) U.S. Cl. .......................... 250/338.4; 250/338.1
(58) Field of Search .................... 250/338.4, 338.3, 250/338.1; 257/431, 439, 451

(56) References Cited

U.S. PATENT DOCUMENTS

| | | | |
|---|---|---|---|
| 4,005,605 A | | 2/1977 | Michael |
| 4,008,610 A | | 2/1977 | Larsen et al. |
| 4,116,063 A | | 9/1978 | Leblanc et al. |
| 4,136,526 A | | 1/1979 | Chanin et al. |
| 4,270,973 A | | 6/1981 | Schmit et al. |
| 4,409,483 A | | 10/1983 | Turley |
| 4,640,629 A | | 2/1987 | Antonini et al. |
| 4,652,901 A | | 3/1987 | Nothaft |
| 4,745,278 A | | 5/1988 | Hanson |
| 4,940,898 A | * | 7/1990 | Mahan ................. 250/338.4 |
| 5,021,663 A | | 6/1991 | Hornbeck |
| 5,030,831 A | * | 7/1991 | Coon et al. ........... 250/370.14 |
| 5,090,819 A | | 2/1992 | Kapitulnik |
| 5,260,225 A | * | 11/1993 | Liu et al. ..................... 438/54 |
| 5,288,649 A | | 2/1994 | Keenan |
| 5,357,130 A | | 10/1994 | Scholz et al. |
| 5,369,280 A | | 11/1994 | Liddiard |
| 5,566,046 A | | 10/1996 | Kulwicki |
| 5,801,383 A | | 9/1998 | Wada et al. |
| 5,939,971 A | | 8/1999 | Yong |
| 5,977,603 A | * | 11/1999 | Ishikawa ..................... 257/451 |
| 6,191,420 B1 | * | 2/2001 | Souma .................... 250/338.1 |
| 6,201,244 B1 | | 3/2001 | Ju et al. |
| 6,346,703 B1 | | 2/2002 | Lee et al. |
| 6,392,232 B1 | * | 5/2002 | Gooch et al. .............. 250/332 |

* cited by examiner

*Primary Examiner*—Albert Gagliardi
(74) *Attorney, Agent, or Firm*—Robert M. Padilla; John F. Schipper

(57) ABSTRACT

Bolometer system and method for detecting, at BLIP levels, presence of radiation over a broad range of wavelengths in an infrared spectrum and in a temperature range from 20 K to as high as room temperature. The radiation is received by a Si crystal having a region that is doped with one or more of In, Ga, S, Se, Te, B, Al, P, As and Sb in a concentration ratio in a range such as $5 \times 10^{-11}$ to $5 \times 10^{-6}$. Change in electrical resistance $\Delta R$ due to receipt of the radiation is measured through a change in voltage difference or current within the crystal, and the quantity $\Delta R$ is converted to an estimate of the amount of radiation received. Optionally, incident radiation having an energy high enough to promote photoconductivity is removed before detection.

14 Claims, 3 Drawing Sheets

WIDE OPERATIONAL RANGE THERMAL SENSOR

ORIGIN OF THE INVENTION

The invention disclosed herein was made by employees of the United States Government and may be manufactured and used by or for the Government for governmental purposes without payment of any royalties for such manufacture and use.

1. Field of the Invention

This invention relates to sensing of infrared radiation using semiconductor materials.

2. Background of the Invention

It is often desirable to detect the presence of infrared radiation across a large part of the infrared spectrum (e.g., 1–1000 μm) and at sensor temperatures from 30 K to 100 K, or even up to 300 K. One device, a resistive bolometer, detects such radiation by sensing a change in electrical resistance or conductivity of a thermally-sensitive component that reacts to presence of such radiation. Bolometers are discussed by T. Limperis and J. Mudar in "Detectors", published in *The Infrared Handbook*, ed. by W. L. Wolfe and G. J. Zissis, Environmental Research Institute of Michigan, First Ed., Third Printing, 1989, pp. 11-1 through 11-104. Most sensitive bolometers provide infrared detection only for bolometer temperatures at or below liquid helium temperatures ($T \leq 4.2$ K at atmospheric pressure). Other bolometers operate at selected temperatures above liquid helium (LHe) temperatures, and these often do not cover all of an infrared wavelength range of interest.

Some high temperature superconductor bolometers, such as $YBa_2Cu_3O_x$ deposited on a substrate of $SrTiO_3$, operate within a very narrow range of temperatures, some as high as T=90 K, but over limited wavelength ranges and with high 1/f noise that is not well understood. Room temperature pyroelectric detectors, also discussed by Limperis and Mudar, op cit, may be operated at temperatures down to about 100 K, with the limitation that the detector responsivity for a given detector material falls dramatically with decreasing temperature.

Thermopile detectors, relying on a thermoelectric effect and discussed by Limperis and Mudar, op cit, have been used at moderate cryogenic temperatures for planetary and space exploration applications, with the limitation that they provide relatively low infrared sensitivity that does not increase adequately as temperature decreases.

Photoconductive infrared detectors, discussed by Limperis and Mudar, op cit, operate over a temperature range of 4–300 K, but over a limited wavelength range.

A capacitive bolometer, which relies on temperature dependence of a dielectric constant or upon a loss coefficient of a ferroelectric glass ceramic, has not been developed for commercial use thus far, largely because of its low operating temperature requirements. Most resistive semiconductor bolometers appear to be useful only at cryogenic temperatures. GaAs bolometers that operate at room temperature have been applied to sense submillimeter radiation by attachment to a carefully sized antenna but are very insensitive to changes in illumination.

Presently, the commercial bolometer market is dominated by compensated Ge:Ga crystal bolometers, operated at pumped liquid helium (LHe) temperatures, although successful bolometers incorporating Ge:Sb or Ge:In or Si:P have been tested, for low temperatures ($T \leq 4.2$ K). These bolometers are sensitive over the infrared spectrum of interest. GaAs is relatively costly and very difficult to purify for low temperature applications.

Operation of an optimal infrared detector at or near a background limited performance (BLIP) level would allow detection of infrared signals limited primarily by the self-generated thermal noise of the detector, with other noise sources being substantially absent. Present bolometers and present thermopiles operate at levels that are degraded by factors of about 100 and 10, respectively, below BLIP level performance.

What is needed is an infrared detector that operates over a wide range of temperatures, preferably up to 300 K, over substantially the entire infrared spectrum and that operates in a background limited performance situation. This detector should be further optimizable for operation in specific temperature regimes, preferably through choice of a doping density. Bolometers of one material type that can be optimized for any selected temperature range offer considerable economic advantages.

SUMMARY OF THE INVENTION

These needs are met by the invention, which uses a semiconductor material, preferably silicon, doped with selected dopants, such as In, Ga, S, Se, Te, B, Al, As, P and Sb, that have certain desirable temperature coefficients for resistance over a wide range of temperatures, preferably from about 20 K to about 300 K. The preferred dopant concentration lies in a range 0.1–1000 ppb, depending upon the dopant chosen, the desired sensitivity, the temperature range of interest, the measurement environment and other relevant parameters. A resistance difference $\Delta R$ induced in the temperature sensing region is determined through a voltage difference or current difference, depending upon the bias method applied, measured in an associated signal processing circuit.

An important practical advantage in use of such (doped) silicon, as opposed to use of other semiconductors such as Ge and GaAs or of exotic materials such as $V_xO_y$, is that silicon processing is relatively straightforward, inexpensive and does not require use of exotic processing regimes or exotic devices for electrical charge or voltage transfer. Silicon processing, with or without dopants present, has been fully developed and optimized over the last 50 years, and standard processing techniques and environments can be used to fabricate these thermal detectors. Silicon is relatively inexpensive to produce, compared with GaAs or $V_xO_y$. Formation of electrical contacts on a silicon detector is also straightforward and reliable, using contact materials such as ion implanted or diffused heavily doped silicon and epitaxial growth. The construction of arrays of Si bolometers can utilize well developed techniques for chemical etching and photolithography on a single wafer of Si. $SiO_2$ and $Si_3N_4$ films are compatible with the Si processing steps used to mask bolometer sensors.

Electrical contacts are ohmic, thus producing little or no excess current noise. Fabrication of a silicon-based detector is less expensive (by an estimated factor of about 100), which lowers the unit price of the thermal sensor unit. Most important, indium dopant may be incorporated in silicon over a wide range of dopant concentrations, with little change in the basic structure of the silicon matrix. This allows precise control of impedance, through adjustment of the dopant in the silicon.

DESCRIPTION OF BEST MODES OF THE INVENTION

Response of a bolometer to receipt of radiation is determined by the temperature coefficient of electrical resistance for the bolometer material $$\alpha = (1/R)dR/dT. \quad (1)$$

For an impurity-doped semiconductor crystal, the temperature coefficient $\alpha$ is negative (conductivity increases with increasing temperature) and electrical resistivity is approximately $$\rho = \{eN_0\mu(T)\exp(E_I/k_BT)\}^{-1}, \quad (2)$$

where e is electronic charge, $N_0$ is charge carrier concentration, $\mu(T)$ is mobility for the majority carrier, $k_B$ is the Boltzmann constant and $E_I$ is an impurity ionization energy. The ac electrical component $\Re$ of the bolometer response is proportional to $$\Re(\omega) = -\alpha V(R)/\omega. \quad (3)$$

A larger value of $\Re$ is usually preferred.

A bolometer with resistance $R_B$ is often biased through a load resistance of about 10 $R_B$, or higher. For practical electrical signal considerations, such as impedance load matching, $R_B = 10^6$ Ohms, and a 1 mm cube semiconductor crystal with resistivity $\rho$, the parameter $\Re$ can be computed for a suitable operating temperature $T_{oper}$. Table 1 compares some useful parameters for some doped silicon and doped germanium, including an exponent parameter E0 that is empirically determined for the parameter $E_I$ in Eq. (2). For example, the coefficient $\alpha(T)$ may be approximated by $$ln\{-\alpha(T)\} \approx E1 - E0/T, \quad (2)$$

where E1 and E0 are independent of, or very weakly dependent upon, T.

TABLE 1

Parameters for Some Extrinsic Doped Semiconductors

| Material | E0 (meV) | $T_{oper}$ (K) | $\alpha$ (K$^{-1}$) |
|---|---|---|---|
| Si:In | 153 | 20–300 | −0.17 |
| Si:Ga | 71 | | |
| Si:S | 310 | | |
| Si:Se | 260 | | |
| Si:Te | 140 | | |
| Si:P | 45 | 1.2–4.2 | −1 |
| Si:Sb | 43 | | |
| Si:B | 45 | | |
| Si:Al | 68 | | |
| Si:As | 54 | | |

Figure 1:
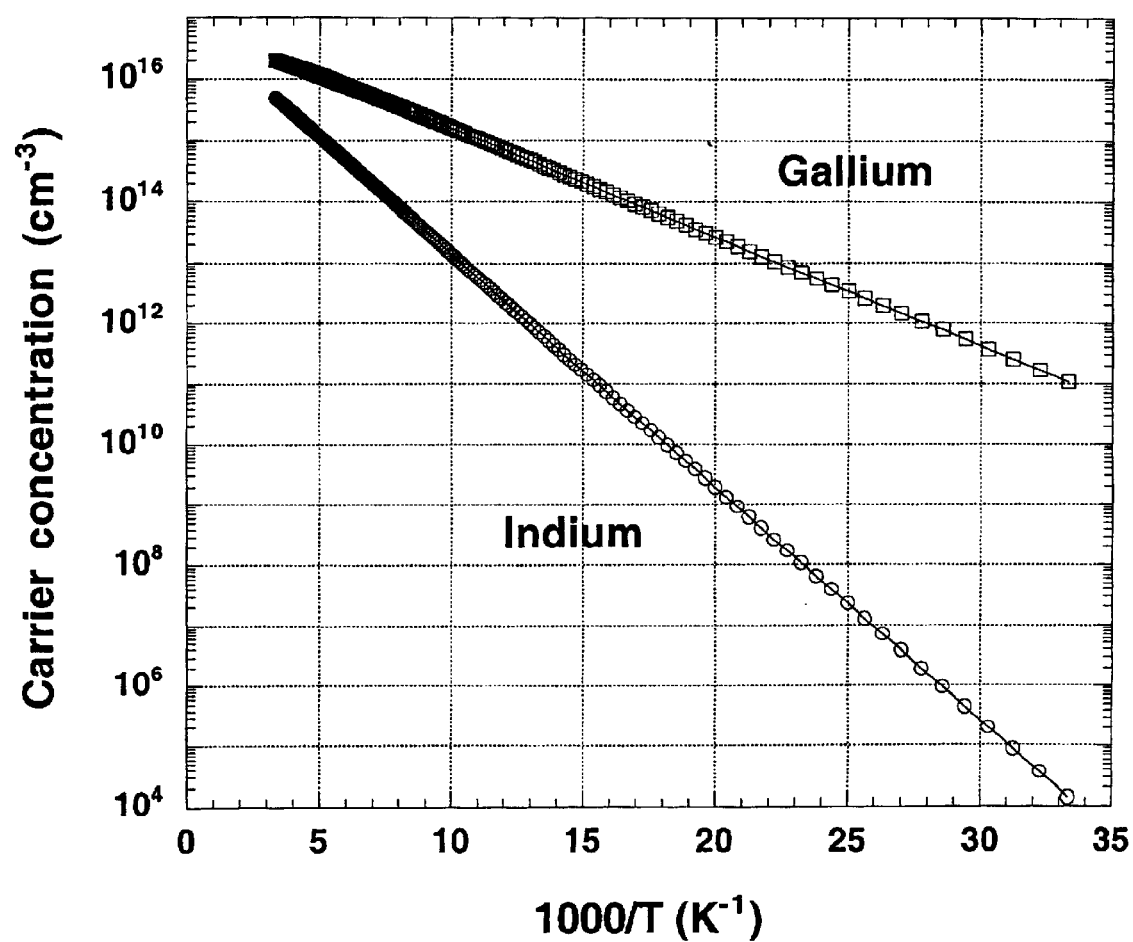
FIG. 1 graphically illustrates a semilog plot of electrical resistance of doped silicon over selected temperature ranges.

FIG. 1 graphically illustrates $\log_e$(carrier conc.) versus 1/T (inverse temperature) over a temperature range of 20–300 K, calculated for silicon crystals doped with indium (In) and with gallium (Ga). Note that, in these plots, each of these curves is substantially linear for operating temperatures T in a substantial range $T1 \leq T \leq T2$. Linearity over a wide temperature range is desirable for improved accuracy in a temperature-sensing instrument.

Figure 2:
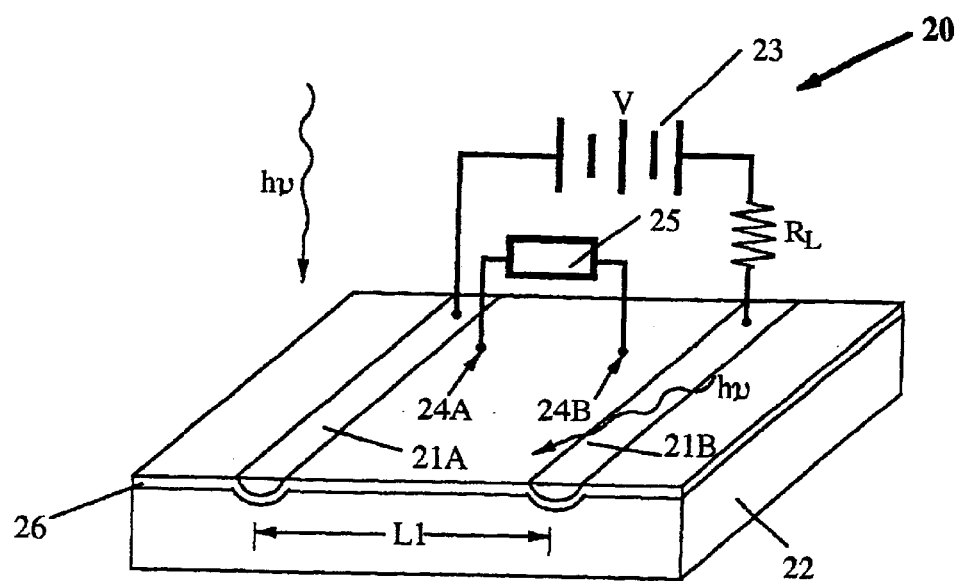
FIGS. 2 and 3 schematically illustrate apparatus for practicing the invention.

One or more selected regions of an Si crystal is doped with one of these dopants, preferably In with a doping concentration in a range $10^{12}$–$10^{17}$ cm$^{-3}$ or somewhat higher, so that the doping fraction is $5\times10^{-11}$ to $5\times10^{-6}$, or somewhat higher. In a first configuration 20, shown in FIG. 2, first and second voltage source or current source connection sites, 21A and 21B, are spaced apart and set within a Si semiconductor crystal 22 doped with one or more of several dopants. The connection sites, 21A and 21B, have a separation length (L1) and are connected by a current source or voltage source 23. Two selected and spaced apart locations, 24A and 24B, on or within the crystal 22 and adjacent to the respective connection sites, 21A and 21B, are connected through a signal processing circuit 25. Incident infrared radiation photons of h vare received or absorbed on and within the doped crystal 22, or upon an antenna attached thereto, on a portion that is optionally exposed to the incident radiation through apertures in a mask (not shown in FIG. 2 or 3), causing a crystal temperature excursion.

Optionally, an absorber 26 of radiation in a selected wavelength range is added to the surface to adjust the response in a particular wavelength range and/or to absorb photons that would otherwise produce photoconductivity in the crystal. An Si bolometer can be made to work without an absorber at wavelengths that are absorbed (only) by phonon bands of the crystal in the far infrared; such wavelengths do not excite photoconductivity in the crystal. Only thermal energies, below the photoconductivity cut-off, are of interest here.

The signal processing circuit 25 determines and displays a measure of the difference, $\Delta I = I(24A) - I(24B)$, between current measured through the irradiated doped crystal 22 and a reference current that would be measured if the crystal 22 were undoped. Alternatively, a voltage difference, $\Delta V = V(24A) - V(24B)$, can be measured at the locations 24A and 24B. The measured current difference $\Delta I$ or voltage difference $\Delta V$ (alternating, with and without receipt of the radiation h v) is used with Eqs. (1) and/or (2) to determine the temperature rise $\Delta T$ in the irradiated doped region 22, through estimation or determination of a resistance difference $-\Delta R$ (<0) between the first and second connection regions, 21A and 21B. The temperature rise $\Delta T$ is then related to the total radiant energy difference $\Delta E$ absorbed by the doped crystal 22 by a relation such as $$\Delta E = \sum_{i=1}^{I} \int_{T0}^{T0+\Delta T} m(i) \cdot c_p(T'; i) dT', \quad (4)$$

where $c_p(T';i)$ is a known specific heat capacity and m(i) is the mass of the first doped region, for species i in a composite material (i=1, . . . , I). Equations (1), (2) and (4) are preferably used to provide a measure of the radiant energy difference $\Delta E$ absorbed by the doped crystal 22 or optional absorber 26. Optionally, the incident radiation h vis filtered to admit only wavelengths within a selected wavelength range so that the radiant energy difference $\Delta E$ refers to only the selected wavelength range.

Figure 3:
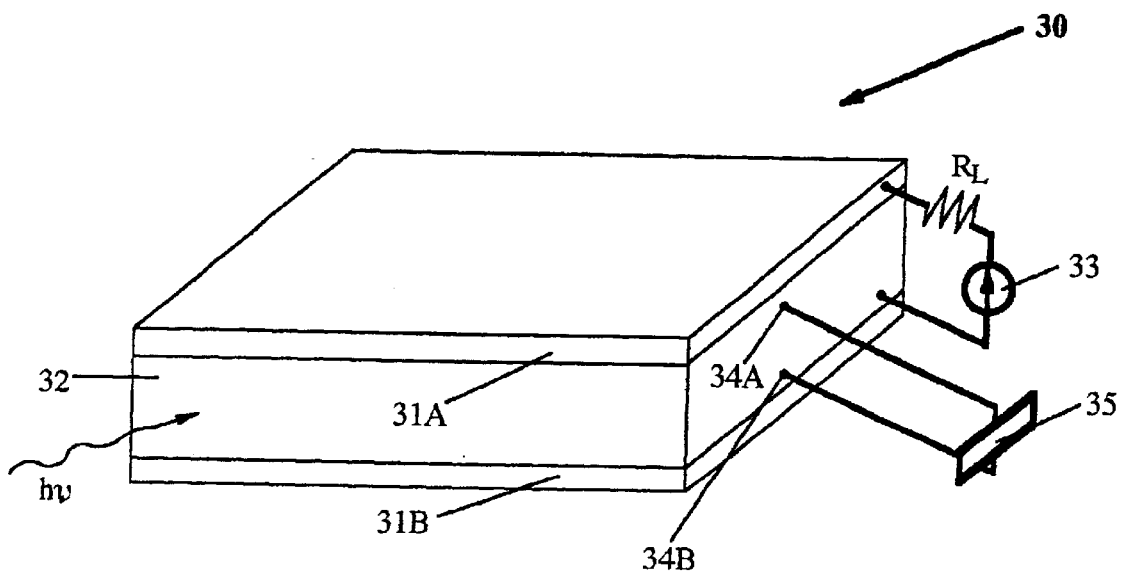

FIG. 3 shows a second configuration 30 in which first and second connection sites, 31A and 31B, are located on opposed surfaces of a doped semiconductor crystal 32. The two connection sites, 31A and 31B, are connected to a current source or voltage source 33. Two selected and spaced apart locations, 34A and 34B, on or within the crystal 32 are connected through a signal processing circuit 35. Incident infrared radiation h vis received on and within the doped crystal 32, on a portion that is optionally masked from the incident radiation by a mask (not shown in FIG. 3).

The signal processing circuit 35 determines and displays a measure of the difference, ΔI=I(34A)−I(34B), between the locations 34A and 34B, and current that would be measured in the absence of the radiation. Alternatively, a voltage difference, ΔV=V(34A)−V(34B), can be measured between the locations 34A and 34B adjacent to the respective first and second connection regions, 31A and 31B. The radiant energy difference ΔE absorbed by the first doped region 31A is determined in a manner analogous to that used for the configuration 20 in FIG. 2.

Figure 4:
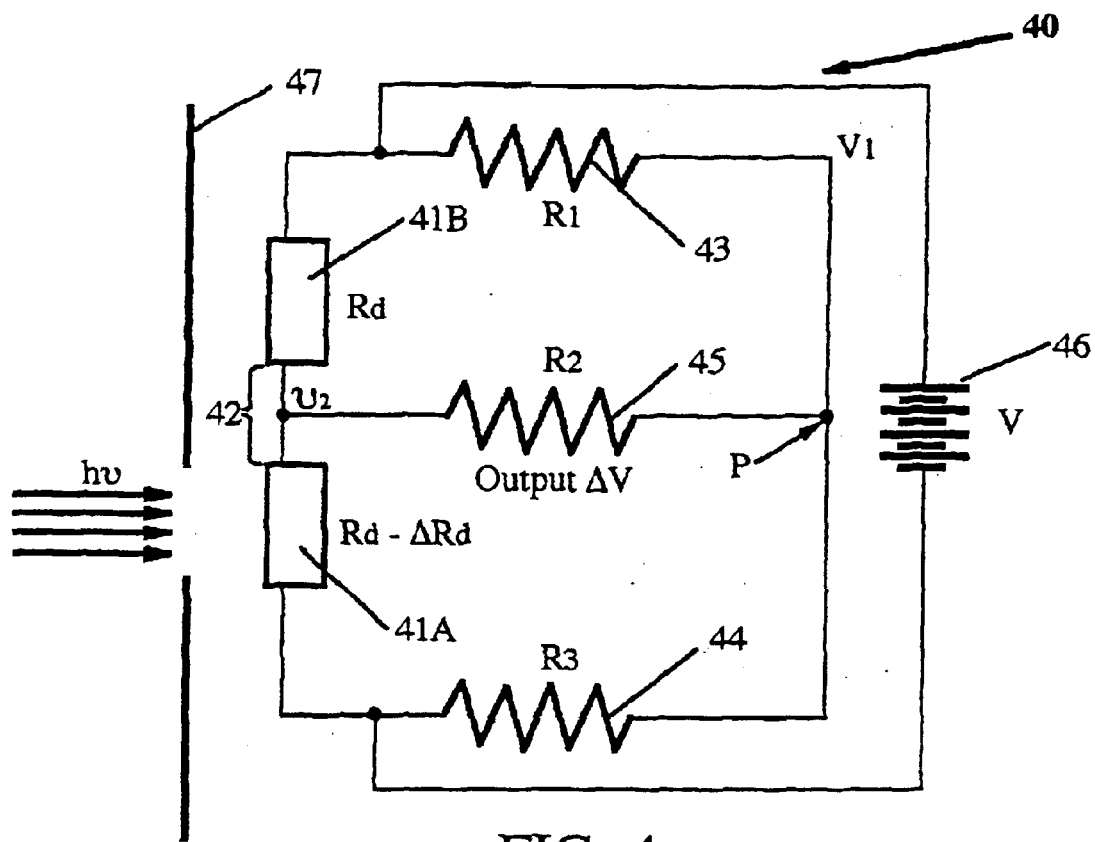
FIGS. 4 and 5 schematically illustrate circuits suitable for determining change in electrical resistance in practice of the invention.
Figure 5:
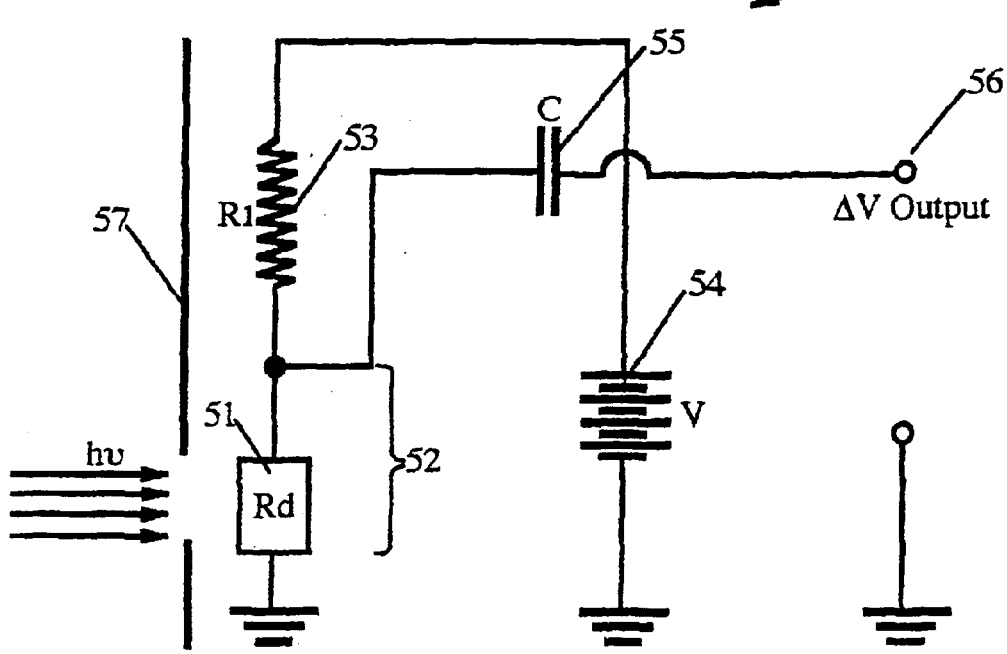

FIGS. 4 and 5 schematically illustrate first and second detector systems, 40 and 50, that can be used to determine the resistance difference −ΔR. In FIG. 4, radiation h ν incident on a first doped region 41A produces a resistance difference −ΔR relative to the resistance in a second, un-irradiated, thermally isolated, doped region 41B, spaced apart by a region 42. A first end of each of the first and second doped regions, 41A and 41B, is connected through a resistor, 43 and 44, respectively, to a common point P and to first and second terminals of a voltage source 46. Second ends of each of the doped regions, 41A and 41B, are connected together through a third resistor 45 to the point P. A mask 47 is optionally positioned to shield the second doped region 41B from the incident radiation h ν. The resistance difference ΔR is determined by a measurement of steady state current I through the irradiated bolometer resistor 41A according to the relation $$\Delta V(\text{change in voltage across resistor } 45) = (IR_2 \Delta R)/(R_1 + 2R_2 + R_3). \quad (5)$$

In FIG. 5, radiation h ν incident on a single doped region 51 of an Si crystal 52 causes a change ΔV in steady state voltage, measured at an output terminal 56, according to a relation $$\Delta V = (R_1 V \Delta R)/((R_d + R_1)^2). \quad (6)$$

A first end of the doped region 51 is grounded, and a second end is connected through a resistor 53 to a first terminal of a voltage source 54 and through a capacitor 55 to the output terminal 56 that measures change ΔV in a steady state voltage due to receipt of the incident radiation. Optionally, portions of the crystal that are not to be irradiated are protected by a mask 57. The configuration shown in FIG. 5 operates with one, rather than two, doped regions. Other signal processing circuits, using one or two doped regions, can also be used to determine the energy (difference) ΔE absorbed by an irradiated doped region of a semiconductor crystal.

The semiconductor crystal used as a substrate for these embodiments may be Si or any other suitable semiconductor material that permits controlled doping with selected dopants, such as In, Ga, S, Se, Te, B, Al, As, P and Sb, all with relatively high values of ionization energy E0 in Table 1. Si may also be prepared using co-dopants, such as Si:In/Ga, Si:In/Sb or Si:Ga/Sb, in varying fractions f(5×$10^{10} \leq f \leq 5 \times 10^{-6}$) for use in thermal sensors, because of the shared linearity of α (with 1 T) over wide temperature ranges.

A material such as GaAs or $V_xO_y$, will often provide a larger absolute thermal sensor signal level $S_{th}$ than will Si doped with one of the selected dopants. That is, the value of α in Eq. (1) may be larger for some of these other materials than for Si doped with one of the selected dopants. However, it is the signal-to-noise ratio SNR, not the absolute signal level, that is controlling for the desired signal. Si doped with small amounts of the selected dopants has associated SNR values that are about as large as can be theoretically achieved, with an associated noise factor that is near the theoretical thermal limit N(T) for noise, given by $$N(T) = \sqrt{\left\{ 4Rk_BT + G \sum_{i=1}^{I} c_P(T;i) \cdot m(i) \right\}} \quad (7)$$

R=resistance of an associated circuit, (8)

G=thermal conductance of the bolometer, (9)

$c_P$(T;i)=specific heat capacity of bolometer component (i), (10)

m(i)=mass density of bolometer component (i), (11)

By comparison, where the SNR for a material such as GaAs or $V_xO_y$ has been measured, this SNR value has been found to be much smaller than a BLIP value and to include substantial contributions from other noise processes, such as shot noise, electrical surface noise and electrical leakage noise.

As another measure of the close approach of doped Si to the thermal limit of noise, a detectivity parameter D* (Watts/cm-√Hz), which incorporates the effect of presence of noise and exposed area, is often measured for electrical or thermal devices. For thermal sensing devices, the thermal limit is D*≈$10^{10}$–$10^{11}$ at room temperature. The detectivity for room temperature Si lies in a range D*≈$10^9$–$10^{10}$, whereas the corresponding detectivity for most other materials is at least a factor of 10 smaller. At the noise limit, a factor of 10 improvement in D* allows a 100-fold decrease in observation time in obtaining similar results.

What is claimed is:

1. A system for detecting presence of thermal radiation, the system comprising:

a module of silicon (Si), having a region doped with In, having a dopant fraction f(In) in the semiconductor material in a range, $5 \times 10^{-11} \leq f(\text{In}) \leq 5 \times 10^{-6}$;

a coating for the doped region that absorbs substantially all radiation having a wavelength below a photoconductivity cut-off wavelength for Si doped with In and is at least partly transparent to radiation having at least one wavelength above the photoconductivity cutoff wavelength so that substantially no radiation having a wavelength below the photoconductivity cutoff wavelength is received by the doped region; and a circuit connected to the doped region at first and second spaced apart locations, to receive at least one electrical signal that passes within the doped region, and to provide a measure of at least one of (i) current passing through the doped region and (ii) a voltage difference measured between two selected locations within the doped region;

whereby the circuit provides a first value of the at least one of the current and the voltage difference when radiation, from a selected source having at least one wavelength in the infrared spectrum is received by the doped region and provides a second value of the at least one of the current and the voltage difference if the radiation is not received by the doped region, over a module temperature range from 20 K to 300 K.

2. The system of claim 1, further comprising a second doped region, spaced apart from said first doped region, substantially thermally isolated from receipt of radiation from said radiation source, and connected to said circuit.

3. The system of claim 2, wherein said circuit is connected to said first and second doped regions and provides a measure of a difference of said current passing through said first doped region and passing through said second doped region.

4. The system of claim 2, wherein said circuit is connected to said first and second doped regions and provides a measure of a difference of said voltage measured at a selected location adjacent to or within said first doped region and said voltage measured at a selected location adjacent to or within said second doped region.

5. The system of claim 1, wherein said circuit provides a measure of amount of radiation received by said doped region from said measure of at least one of said current passing through said doped region and said voltage difference measured at said two selected locations within said doped region.

6. The system of claim 1, wherein said module of silicon has a region doped with at least one additional dopant drawn from a group of dopant materials consisting of Ga, S, Se, Te, B, Al, P, As and Sb, where the at least one additional dopant has a dopant fraction f(dopant) in a range $5 \times 10^{-11} \leq f(dopant) \leq 5 \times 10^{-6}$.

7. The system of claim 1, wherein said doped region of said silicon module comprises a second coating of silicon doped with an infrared-absorbing dopant having a characteristic infrared absortption thickness, having a second coating thickness at least equal to ten times the infrared absorption thickness, and being positioned on at least one exposed surface of said silicon module.

8. A method for detecting presence of thermal radiation, the method comprising:

positioning a module of silicon (Si), having a region doped with In, having a dopant fraction f(In) in the semiconductor material in a range, $5 \times 10^{-11} \leq f(In) \leq 5 \times 10^{-6}$, to receive radiation from a selected radiation source having at least one wavelength in the infrared spectrum and above a photoconductivity cut-off wavelength for the dopant;

providing a coating for the doped region that absorb substantially all radiation having wavelength below a photoconductivity cut-off wavelength of Si doped with In and is at least partly transparent to radiation having at least one wavelength above the photoconductivity cutoff wavelength so that substantially no radiation having a wavelength below the photoconductivity cut-off wavelength is received by the doped region; and providing a circuit, connected to the doped region at first and second spaced apart locations, to receive at least one electrical signal that passes within the doped region, and to provide a measure of at least one of (i) current passing through the doped region and (ii) a voltage difference measured between two selected locations within the doped region, whereby the circuit provides a first value of the at least one of the current and the voltage difference if the radiation is received by the doped region and provides a second value of the at least one of the current and the voltage difference if the radiation is not received by the doped region, over a module temperature range from 20 K to 300 K.

9. The method of claim 8, further comprising providing a second doped region, spaced apart from said first doped region, substantially thermally isolated from receipt of said radiation, and connected to said circuit.

10. The method of claim 9, further comprising providing a measure of a difference of said current passing through said first doped region and passing through said second doped region.

11. The method of claim 9, further comprising providing a measure of a difference of said voltage difference measured at a selected location adjacent to or within said first doped region and said voltage difference measured at a selected location adjacent to or within said second doped region.

12. The method of claim 8, further comprising providing a measure of amount of radiation received by said doped region from said measure of at least one of said current passing through said doped region and said voltage difference measured between said two selected locations within said doped region.

13. The method of claim 8, further comprising providing said module of silicon with said region doped with at least one additional dopant drawn from a group of dopant materials consisting of Ga, S, Se, Te, B, Al, P, As and Sb, where the at least one additional dopant fraction lies in a range $5 \times 10^{-11} \leq f(dopant) \leq 5 \times 10^{-6}$.

14. The method of claim 8, further comprising providing said doped region of said silicon module as a a second coating of silicon doped with an infrared-absorbing dopant having a characteristic infrared absortption thickness, having a second coating thickness at less equal to ten times the infrared absorption thickness, and being positioned on at least one exposed surface of said silicon module.

\* \* \* \* \*